ized by failure

(12) United States Patent
Pabón et al.

(10) Patent No.: US 10,379,973 B2
(45) Date of Patent: Aug. 13, 2019

(54) ALLOCATING STORAGE IN A DISTRIBUTED STORAGE SYSTEM

(71) Applicant: Red Hat Inc., Raleigh, NC (US)

(72) Inventors: Luis Pablo Pabón, Sturbridge, MA (US); Thiago Lucas da Silva, Shrewsbury, MA (US)

(73) Assignee: Red Hat, Inc., Raleigh, NC (US)

( * ) Notice: Subject to any disclaimer, the term of this patent is extended or adjusted under 35 U.S.C. 154(b) by 342 days.

(21) Appl. No.: 14/980,691

(22) Filed: Dec. 28, 2015

(65) Prior Publication Data

US 2017/0185325 A1 Jun. 29, 2017

(51) Int. Cl.
*G06F 11/20* (2006.01)

(52) U.S. Cl.
CPC .................... *G06F 11/20* (2013.01)

(58) Field of Classification Search
CPC .......................................... G06F 11/20
See application file for complete search history.

(56) References Cited

U.S. PATENT DOCUMENTS

| | | | |
|---|---|---|---|
| 7,424,637 B1* | 9/2008 | Schoenthal | G06F 3/0607 711/161 |
| 7,694,173 B1* | 4/2010 | Schoenthal | G06F 3/0607 711/161 |
| 8,032,704 B1 | 10/2011 | Corbett et al. | |
| 8,732,518 B2 | 5/2014 | Storer et al. | |
| 9,641,615 B1* | 5/2017 | Robins | H04L 67/1097 |
| 9,826,030 B1* | 11/2017 | Dhoolam | H04L 67/1008 |
| 2005/0071596 A1 | 3/2005 | Aschoff et al. | |
| 2005/0114593 A1* | 5/2005 | Cassell | G06F 3/0605 711/114 |
| 2008/0109601 A1* | 5/2008 | Klemm | G06F 3/0608 711/114 |
| 2012/0266011 A1* | 10/2012 | Storer | G06F 11/1092 714/1 |

(Continued)

OTHER PUBLICATIONS

FAQ: Replication and Replica Sets, http://docs.mongodb.org/master/faq/replica-sets/ retrieved on Sep. 17, 2015.

(Continued)

*Primary Examiner* — Ryan Bertram
(74) *Attorney, Agent, or Firm* — Lowenstein Sandler LLP

(57) ABSTRACT

A method of allocating storage in a distributed storage system includes receiving a data structure including a plurality of identifiers of storage devices organized by failure zones. Any device of a first failure zone does not share a point of failure with any device of a second failure zone. The method also includes receiving a storage allocation request, identifying a first storage device using a first pointer referencing an unallocated device of the first failure zone, and modifying the first pointer to reference a next unallocated device of the second failure zone. The method also includes identifying a second storage device using a second pointer referencing an unallocated device of the second failure zone, modifying the second pointer to reference a next unallocated device of the second failure zone, and responding to the storage allocation request by providing identifiers of the first storage device and the second storage device.

20 Claims, 7 Drawing Sheets

(56) References Cited

U.S. PATENT DOCUMENTS

| | | | |
|---|---|---|---|
| 2014/0089725 A1* | 3/2014 | Ackaret | G06F 12/0653 714/6.1 |
| 2014/0304375 A1* | 10/2014 | Tsubaki | H04N 21/2343 709/219 |
| 2014/0380303 A1 | 12/2014 | Bello et al. | |
| 2015/0160864 A1 | 6/2015 | Usgaonkar et al. | |

OTHER PUBLICATIONS

Sean Cohen "What's New in Icehouse Storage" http://redhatstackblog.redhat.com/2014/04/15/whats-new-in-icehouse-storage/ Apr. 15, 2014.

John Rhoton "Discover OpenStack: The Storage Components Swift and Cinder" http://www.ibm.com/developerworks/cloud/library/cl-openstack-swift-cinder/ Dec. 12, 2013.

"Deploying Citrix XenServer 5.0 with Dell EqualLogic PS Series Storage" https://support.citrix.com/servlet/KbServlet/download/18389-102-664934/Citrix-XenServer-Equallogic_final_2.pdf, Oct. 6, 2008.

Bob Callaway, Greg Loughmiller "Highly Available OpenStack Deployments Built on NetApp Storage Systems" http://community.netapp.com/fukiw75442/attachments/fukiw75442/virtualization-and-cloud-articles-and-resources/459/1/TR-4323-DESIGN-0814_Highly_Available_OpenStack_Deployment_with_NetApp_Storage.pdf, Aug. 2014.

* cited by examiner

ALLOCATING STORAGE IN A DISTRIBUTED STORAGE SYSTEM

TECHNICAL FIELD

The present disclosure is generally related to distributed storage systems, and is more specifically related to systems and methods for allocating storage in a distributed storage system.

BACKGROUND

Distributed storage systems employ storage devices residing at multiple locations across a network. Distributed storage systems range in size and complexity. The ability to access the features of a distributed storage system provides instant flexibility and adaptability in computing. A distributed storage system may provide access to a plurality of different types of assets. For example, a distributed storage system may provide access to physical machines, virtual machines, containers, and other distributed assets. A virtual machine (VM) is a software artifact that, when executed on appropriate hardware, creates an environment that allows for a virtualization of various resources of an actual physical computer system (e.g., a server, a mainframe computer, etc.). The actual physical computer system is typically referred to as a "host machine," and the operating system of the host machine is typically referred to as the "host operating system." Physical machines may include storage devices, processing devices, or other physical devices. Containers are designed to keep applications and their runtime components together. They can be effective at isolating application to prevent conflicts between applications. In some cases, containers don't contain an operating system or kernel. In some examples, containers may share the same host and share the same kernel.

BRIEF DESCRIPTION OF THE DRAWINGS

The disclosure will be understood more fully from the detailed description given below and from the accompanying drawings of various examples of the disclosure. The drawings, however, should not be taken to limit the disclosure to the specific examples, but are for explanation and understanding only.

The present disclosure is illustrated by way of examples, and not by way of limitation, and may be more fully understood with references to the following detailed description when considered in connection with the figures, in which.

DETAILED DESCRIPTION

Figure 1:
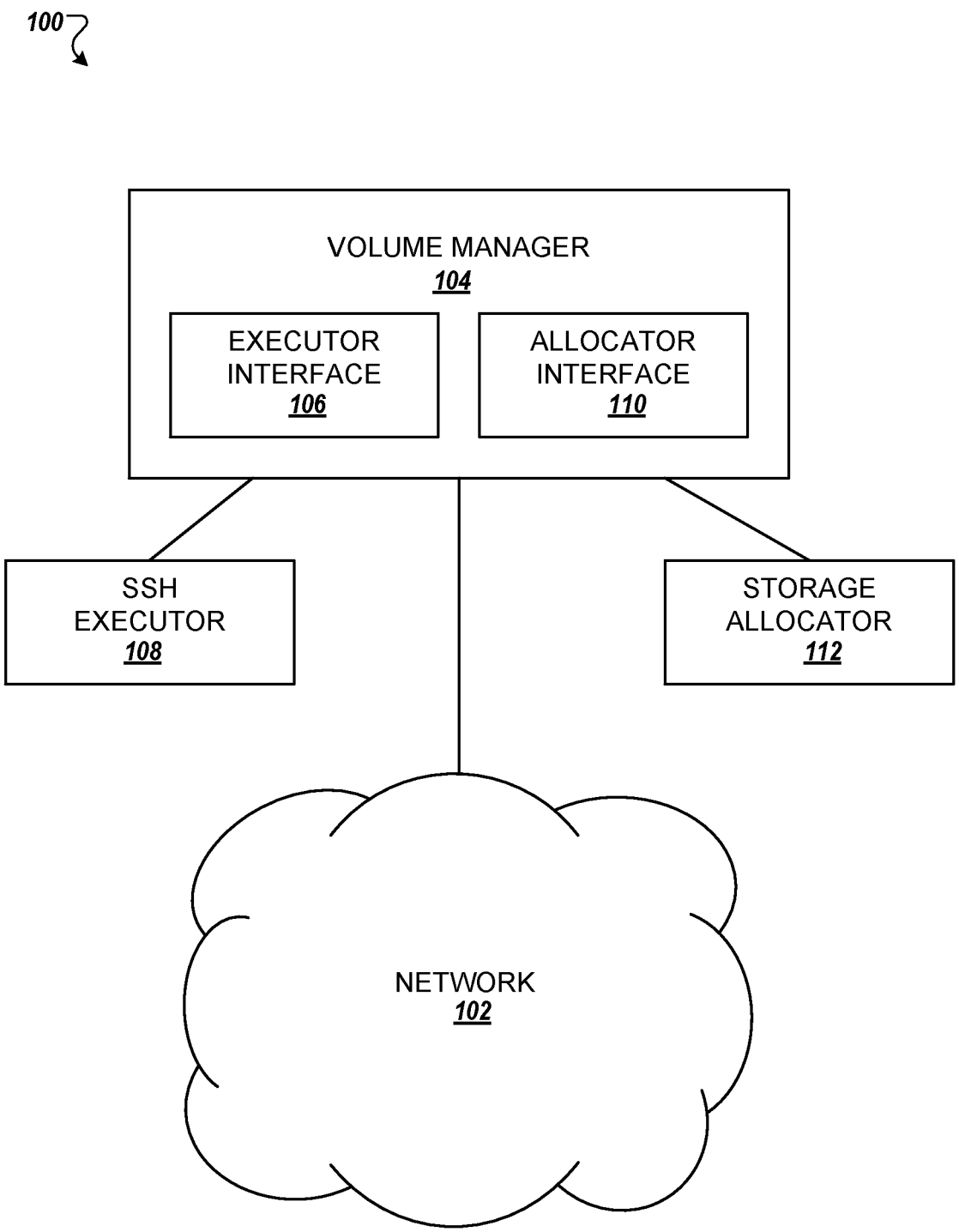
FIG. 1 is a system for managing storage for a distributed network in accordance with one or more aspects of the present disclosure.

Described herein are techniques for allocating storage in a distributed storage system. In a distributed storage system, resources may be located in various geographical locations. Additionally, the resources of the distributed storage system may be grouped by failure zone. A failure zone may be any group of devices or resources (virtual or physical) that share a point of failure. For example, a failure zone may be defined by dependence on storage facilities, processing facilities, power sources, network connections or resources, interfaces, host systems, managers, or other common facilities, resources, or dependencies. Thus, a single resource may be associated with multiple failure zones. Failure zones may vary from relatively small in scope to relatively large. For example, a failure zone may be a single power strip or a national power grid. Other sizes and scopes may be used to define a failure zone.

In a typical distributed storage system, a request for storage is received by the volume manager which checks for availability of storage devices across a storage cluster or group of clusters. A storage cluster is a collection of storage devices organized to collectively service client requests. The clusters may have storage available on resources such as servers, hard drives, solid-state drives, high-speed and low-speed drives, virtual machines, containers, or other storage devices within the cluster. The volume manager receives identifiers of the available storage devices and fills the request for storage by allocating some of the available storage in response to a storage allocation request.

However, in some situations, a failure event, such as a power failure, a hardware failure, a network outage, or other event, may permanently or temporarily compromise access to some or all of the data in the allocated storage. Such an event may even render redundant storage insufficient. If a single resource is employed by multiple redundant instances, a failure of that resource would compromise all such instances. For example, if a primary copy and a redundant copy are stored on different storage devices which share a common power grid, a failure in the power grid may render both facilities inoperable, thus defeating the redundancy. To prevent occurrences from such scenarios, in common implementations, a system administrator would need to manually select storage devices to which a specific request should be directed. This would require considerable time on the part of the system administrator to manually allocate the storage in such a way as to avoid allocation within a common failure zone. In order to be effective, the live administrator would need to have an intimate knowledge of the configurations of the node (a connection point, redistribution point, or end point within a network), disk, cluster, and network of each potential storage location as well as which storage locations are jointly susceptible to any number and scope of failure events. This may include geographical considerations of the nodes, power dependency, network connections, etc. for each node, disk, cluster, and network. This process introduces considerable inefficiencies and may still result in allocations of data to storage locations which are susceptible to a failure event within a failure zone that is unknown to the live administrator.

Aspects of the present disclosure address the above-noted and other deficiencies by providing a management system to fill storage allocation requests within a distributed storage system. The management system may operate on a wide range of distributed storage systems. The distributed storage system may include a plurality of devices in a network at a single location within a data warehouse or other facility. Alternatively, the distributed storage system may be a global storage system with resources at many diverse geographical locations. For example, the examples described herein may be implemented on a private, public, or hybrid cloud. Examples of a distributed storage system may include Gluster® and other distributed resource systems.

Additionally, while the examples described herein are directed to allocation of storage on network resources, other examples may relate to allocation of processing to network processing devices, infrastructure support to infrastructure devices, platform support to network platform devices, software support, application support, virtualization devices, network devices, and other resources and assets. These network resources may be accessible via web browser, mobile application, local or remote client, thin client, terminal emulator, or other distributed storage system client or interface.

In one example, the management system may populate an array with a plurality of failure zone identifiers. Each failure zone may be an array. Each of the plurality of failure zones in the array having an array of identifiers of corresponding nodes which each have identifiers or pointers for a plurality of storage devices corresponding to each node. In some examples, each array may have one or more pointer or identifier. For example, a node array may only include an array with only one storage device identifier.

The failure zones may be determined by analyzing dependencies and failure points at various resources and systems such as power supplies (grids, transformers, data switches, operating systems, etc.). The failure zones may be determined on a storage device level, a node level, a cluster level, or some other level of granularity. The level of granularity of failure zones as well as the failure zones themselves may be specified at the time of an initial mapping the failure zones or adjusted after the initial mapping of the failure zones. For example, a common connection to a public power utility grid may not be considered sufficient to establish a failure zone, while a shared data center location may pose a sufficient level a risk to establish a failure zone which includes all devices within the data center. In another example, a failure zone may be established for a single node because the devices at that node are connected to a single network switch. In one example, the failure zone identifiers may be stored to an array. Each failure zone identified in the array may include an array of corresponding node identifiers. Each node identifier in the array of nodes may include an array of storage device identifiers. In other words, the data may be stored as a tree or nested arrays. The data in the arrays for each of the failure zones, as well as the corresponding nodes, and storage devices may include any of a variety of identifiers such as ID numbers, addresses, descriptions, or other data. Other manners or schemes for the storing the data may be used.

Upon receiving a request to allocate storage, the management system may analyze the request to determine the amount of storage needed, storage device type, and/or other parameters. The management system may compile a list of available storage locations and then select, from the list, the storage locations or devices that fit the parameters of the allocation request. In some examples, the list is generated in response to any change to the failure zones, nodes, or storage devices. In another example, the list may be generated anew in response to each request. Other parameters, such as time, may be implemented to dictate when the list should be refreshed.

In one example, the storage allocator may receive a data structure of identifiers of storage devices grouped into a plurality of lists reflecting failure zones. Devices in a first failure zones do not share a failure point with any devices in a second failure zone in the data structure. The volume manager receives a storage allocation request. In response to the storage allocation request, the storage allocator may identify a first storage device from the data structure using a first pointer. The first storage device may be unallocated or partially allocated and have a remaining storage portion left to be allocated. The storage allocator may modify the first pointer to reference another storage device in the first failure zone. The storage allocator may then identify a second storage device using a second pointer referencing an unallocated device of a second failure zone in the plurality of failure zones. The storage allocator may further modify the second pointer to reference a next device of the second failure zone. The storage allocator may provide a list or ring of the first device and second device to the volume allocator to respond to the storage allocation request by providing the identifiers for the first and second devices.

Advantages of the systems and methods operating in accordance with one or more aspects of the present disclosure include allocating storage devices that do not share a common point of failure, thus allowing for effectively functioning redundant storage schemes. A redundant storage scheme may store a first copy of a data item, for which the request has been made, to a first location on the list generated by the storage allocator and a redundant copy to a second location on the list. Because of the manner in which the list is generated by the storage allocator, subsequent locations on the list are within separate failure zones and can thus be effectively used to prevent data loss. Instead of burdening a system administrator with the onerous task of determining failure zones and manually assigning the redundant storage, the examples described herein have demonstrated the capability of fulfilling thousands of storage allocation requests in mere seconds.

While redundant storage approaches are described, the management system may operate to accommodate a wide range of storage schemes. For example, the first storage location may store a portion of the data in the allocation request while a second location outside a failure zone of the first may store another portion of the data such that the request is filled by the combined capacity of the first and second storage locations. Other storage schemes may also be implemented. Some advantages of the examples described herein include improved failure resistance and improved efficiency in allocation of storage across a distributed storage system.

FIG. 1 is a system 100 for managing storage for a distributed network 102 in accordance with one or more aspects of the present disclosure. The illustrated example includes a volume manager 104 connected to a network 102. The network 102 may be a cloud network, or any other type of private network (e.g., a local area network (LAN), wide area network (WAN), intranet, etc.) or public network (e.g., the Internet). The volume manager 104 may further include an executor interface 106 to facilitate communication with an SSH executor 108. In some examples, the SSH executor 108 may establish a secure shell, tunnel, or channel with the network 102 to facilitate communication between the volume manager 104 and devices or components of the network 102. The SSH executor 108 may establish and authenticate a passwordless connection to provide secure communication. Other types of connections with a wide range of security schemes may be implemented.

The volume manager 104 also includes an allocator interface 110. The allocator interface 110 facilitates communication between the volume manager 104 and the storage allocator 112. The storage allocator 112 provides a list of storage locations on the network 102 to the volume manager 104. Once provided with the list or ring of storage locations, the volume manager 104 may fill a storage request by selecting from the list of storage locations and storing data to one or more of the locations in the list provided by the storage allocator 112. The storage allocator 112 and operations thereof are described in more detail below.

Figure 2:
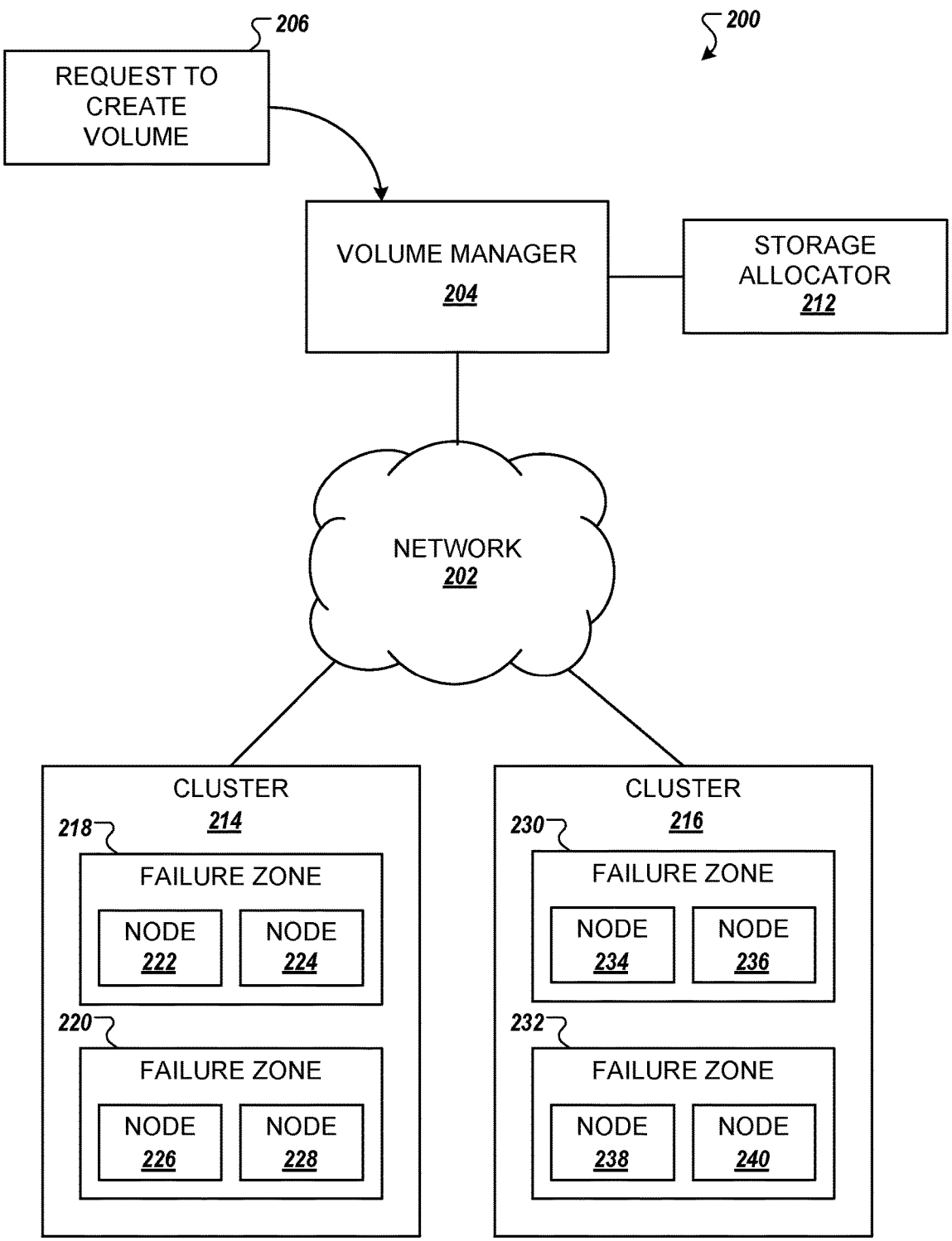
FIG. 2 is an active system with a pending request for managing storage for a distributed network in accordance with one or more aspects of the present disclosure.

FIG. 2 depicts a system 200 with a pending request 206 for managing storage for a distributed network 202 in accordance with one or more aspects of the present disclosure. This system 200 depicts the resources of the network 202. In the illustrated example, the volume manager 204 is in communication with the network 202. The volume manager 204 receives a request 206 to create a storage volume on the network 202. The request 206 may be submitted by a user or an automated system. The request 206 may be submitted directly from a user device or through a server or other intermediate system. Other sources may also submit the request 206. In some examples, the request 206 may specify an amount of storage requested. The request 206 may also specify a type of storage device. For example, the request 206 may request allocation of a disk, solid-state, volatile, non-volatile, ROM, RAM, or other types or classes of storage devices. In some examples, the request 206 may specify a storage scheme or structure. Some examples of a storage scheme include redundant storage in which redundant copies of the data are saved to different storage devices, distributed storage in which a first portion of the data is stored to a first storage device and a second portion of the data is stored to a second storage device, and redundant distributed storage in which the distributed portions of the data also have redundant copies stored at unique locations. Other schemes and organizations may also be specified in the request 206.

In the illustrated example, the volume manager 204 may interpret the request 206 and read a list of storage locations available on the network 202. The storage allocator 212 may provide the list of storage locations to the volume manager 204. The storage allocator 212 may include a database (not shown) which organizes the available resources of the network 202. The database of the storage allocator 212 is described in further detail below. The list or ring generated by the storage allocator 212 may include an ordered list of one or more resources available the network 202 according to failure zones within the network.

The resources of the network 202 may be organized into clusters, failure zones, nodes, and in some examples, storage devices (not shown). In the illustrated example of FIG. 2, the organization of the resources of the network 202 includes a first cluster 214 which includes a first failure zone 218 and second failure zone 220. Each failure zone 218 and 220 includes one or more nodes 222, 224, 226, and 228. The second cluster 216 is similar to the first cluster 214. The second cluster includes a third failure zone 230 and a fourth failure zone 232. Each of the failure zones 230 and 232 in the second cluster 216 includes one or more nodes 234, 236, 238, and 240. Each of the nodes 222, 224, 226, 228, 234, 236, 238, and 240 may further include one or more corresponding storage devices (not shown).

As shown in FIG. 2, a failure zone is a group of nodes and/or storage devices that share a one or more common points of failure. For example, a power loss may affect multiple nodes. Thus the first failure zone 218 in the first cluster 218 may indicate that all of the nodes 222 and 224 within the failure zone 218 are susceptible to a power loss on a local power grid. As described above, the point of failure may also be related to other resources or dependencies such as operating systems, network connections, or other shared or common resources. Each node may be a client, server, peer, or other component or resource of the network 202.

While the network 202 is shown with two clusters 214 and 216, the network 202 may include a single cluster or more than the two clusters 214 and 216 that are depicted. Other examples may include fewer or more failure zones or nodes. Additionally, the volume manager 204 may connect to more than one network 202. For example, the volume manager 204 may connect to a public network and separately to a private network. In these examples, the storage allocator 212 may maintain one or more lists of the resources specific to each network or resource available to the volume manager 204.

Figure 3:
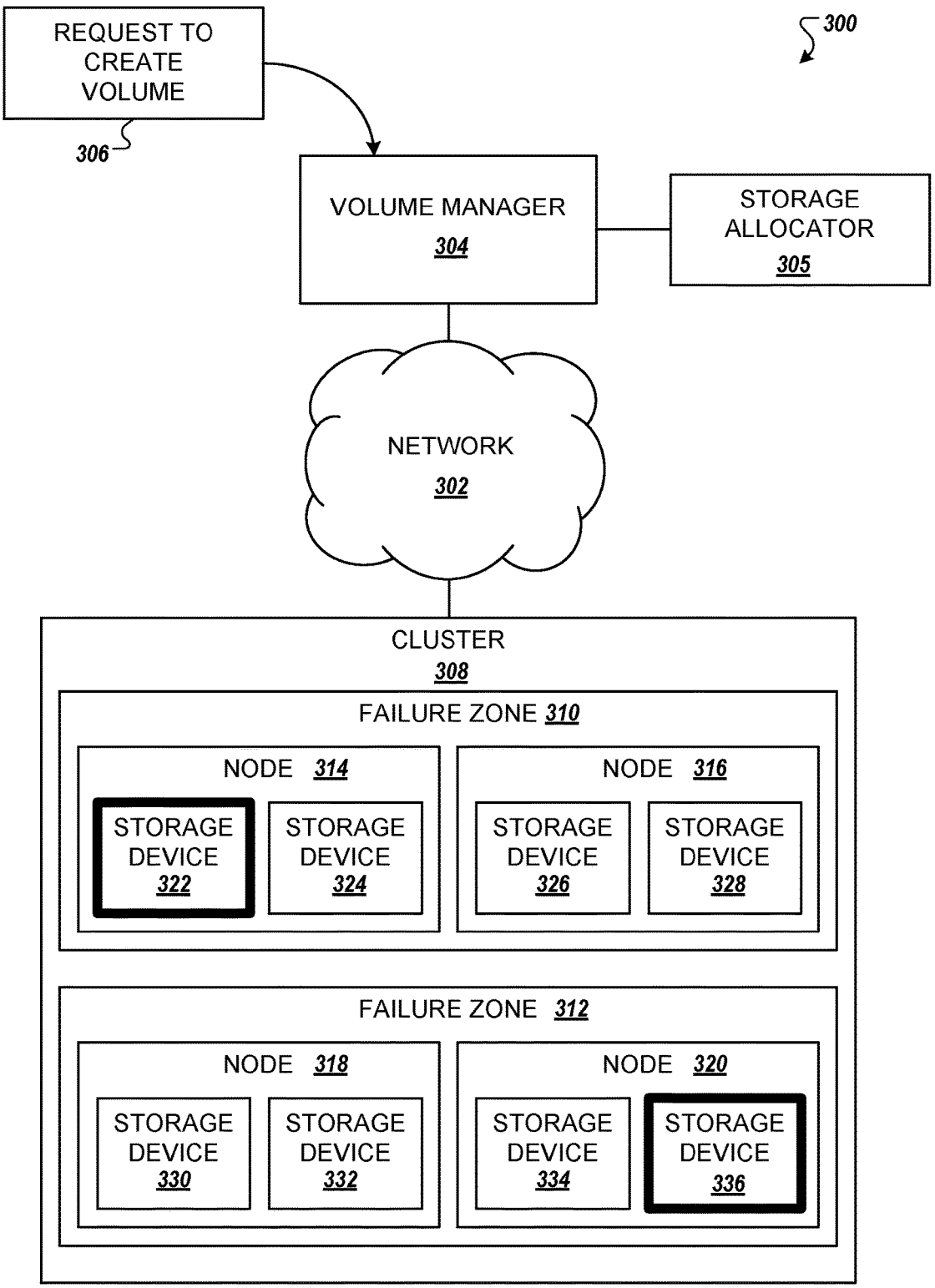
FIG. 3 is yet another system for managing storage for a distributed network with devices identified in accordance with one or more aspects of the present disclosure.

FIG. 3 is yet another system 300 for managing storage for a distributed network 302 with identified devices 322 and 336 in accordance with one or more aspects of the present disclosure. In the illustrated example, the volume manager 304 has received a request 306 to create a volume on the network 302. The storage allocator 305 provides the volume manager 304 with a list of identifiers of certain storage locations within the network 302 which the volume manager 304 may allocate in response to the request 306. In particular, the cluster 308 includes two failure zones 310 and 312. Each of the failure zones 310 and 312 includes corresponding nodes 314, 316, 318, and 320.

In the illustrated example of FIG. 3, the storage allocator 305 has selected a first storage device 322 and a second storage device 336 from the cluster 308 of the network 302. In one example, these storage devices 322 and 336 may be used for redundant storage. The manner in which the storage allocator 305 has selected the storage devices 322 and 336 is described in greater detail below with respect to FIGS. 4 and 5. In general, the storage allocator 305 selects storage devices by selecting the first failure zone 310 and then a node 314 and a corresponding storage device 322 within the first failure zone 310. In order to avoid selecting a storage device 324, 326, or 328 (because they share the same failure zone 310 as the first storage device 322) as the next storage device to suggest, the storage allocator 305 only considers failure zones other than the failure zone 310 of the first selected storage device 322. In the depicted example, the storage allocator 305 suggests, as the second storage device, the storage device 336 from the second node 320 in the second failure zone 320. In this manner, the suggested storage devices 322 and 336 are in separate failure zones 310 and 312. This reduces that probability that data will be completely lost or rendered inaccessible due to a failure event at a point of failure shared by multiple storage devices.

Figure 4:
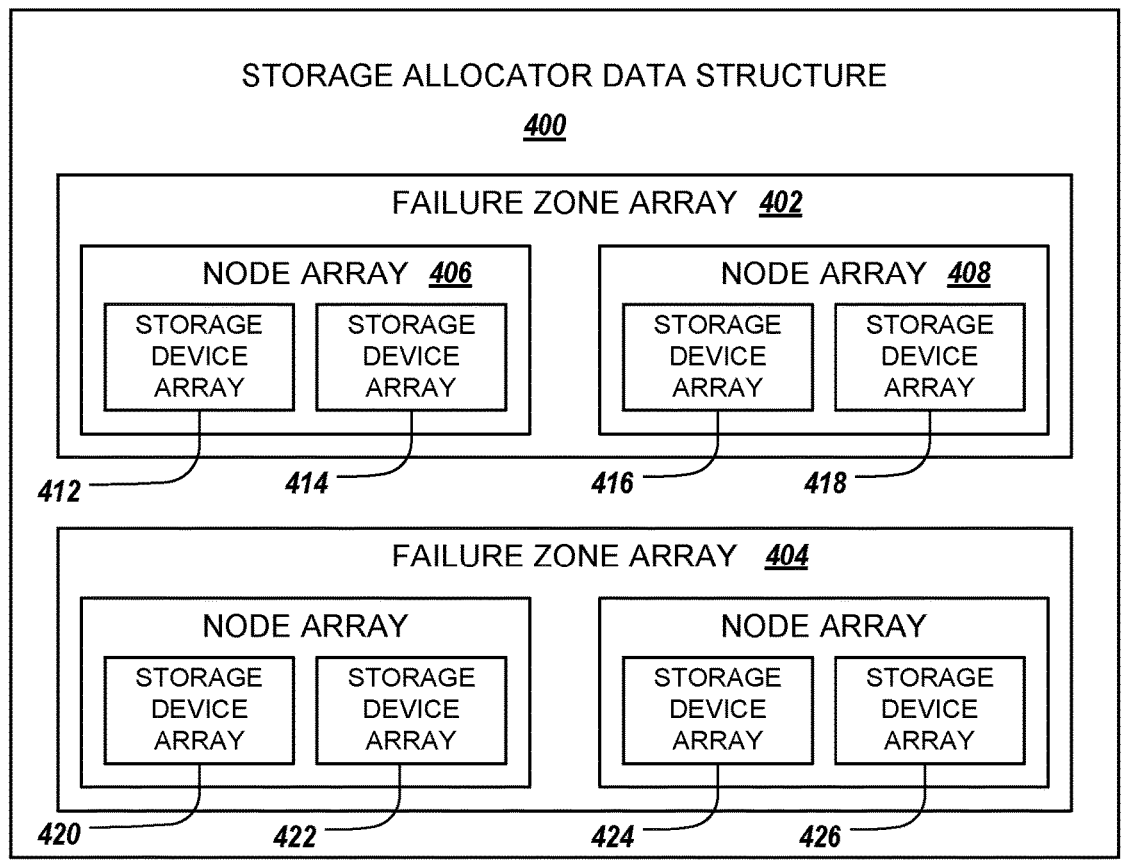
FIG. 4 depicts a data structure for a storage allocator in accordance with one or more aspects of the present disclosure.

FIG. 4 depicts a data structure 400 that may be employed by a storage allocator operating in accordance with one or more aspects of the present disclosure for storing identifiers of storage devices. The illustrated data structure 400 may be used by, for example, the storage allocator 112 of FIG. 1. The data structure 400 includes a first failure zone array 402 and a second failure zone array 404. The database 400 may include fewer or more failure zones of different sizes. The first failure zone array 402 may be a list of lists in that the first failure zone array 402 may be a list identifying the first node array 406 and the second node array 408. Each node array 406 and 408 may be a list of identifiers for storage device arrays 412, 414, 416 and 418, respectively. The second failure zone array 404 is similar to the first failure zone array 402 but organizes arrays of resource identifiers within a second failure zone. In one example, the database 400 may be built based on failure zones. For example, a failure zone 402 for the corresponding arrays of devices 412, 414, 416, and 418 may be determined based on a central power connection common to each of the devices identified in the arrays 412, 414, 416, and 418. The failure zone 402 may also be defined based on a shared network resource such as a physical switch or virtual machine hypervisor used by the resources of the node arrays 406 and 408.

In some embodiments, multiple layers of failure zones may be incorporated. For example, two separate devices may be place in the same failure zone based on a shared power supply but may be in separate failure zones relative to network systems. The system, as described herein, may determine failure zones based on multiple failure zone considerations. For example, if two separate devices share at least one of a network resource, a power resource, a software resource, or some other common resource, the devices may be placed in the same failure zone. In other examples, the system may only include devices in the same failure zone based on power considerations while ignoring network resource dependency. Others may create array trees, generate the ordered list or ring using a first array tree, and filter or modify the list based on a second array tree. Other examples may include other schemes for identifying and sorting multiple failure zone considerations.

Figure 5:
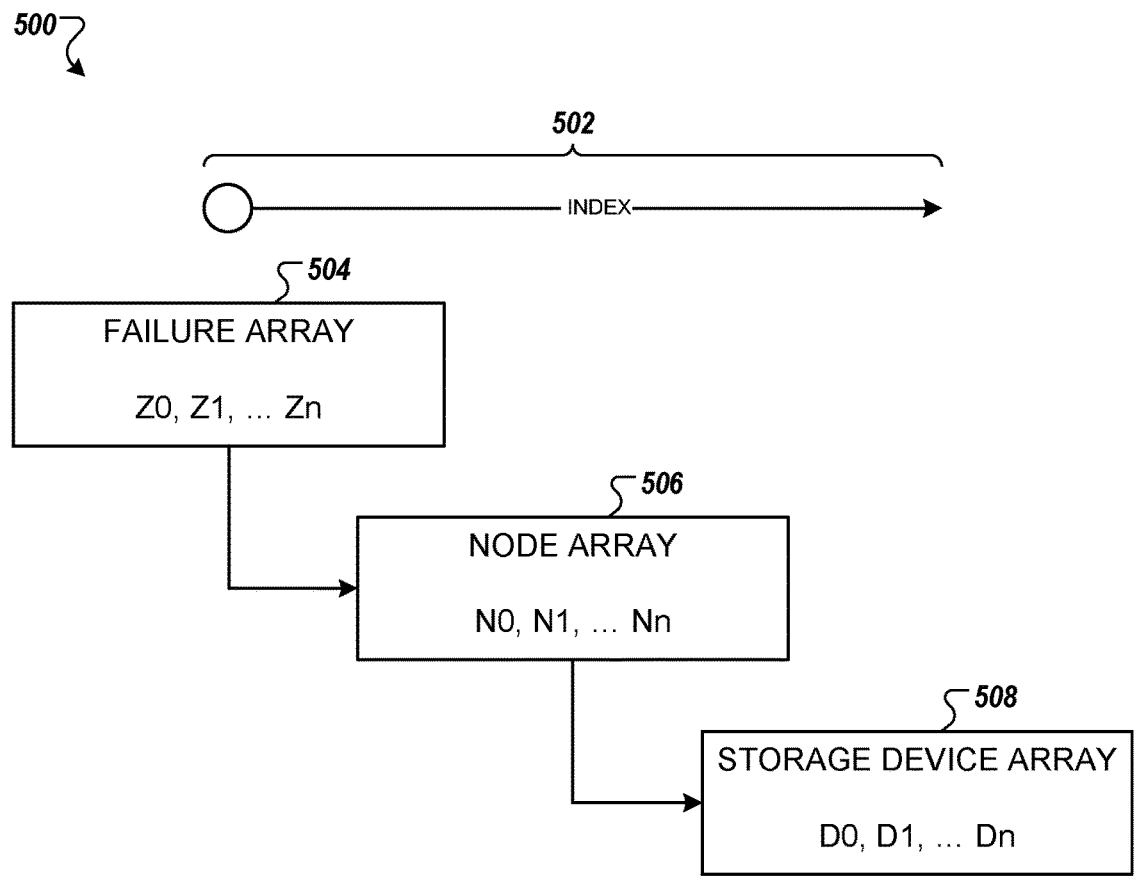
FIG. 5 depicts a block diagram of a hierarchy for managing storage for a distributed network in accordance with one or more aspects of the present disclosure.

FIG. 5 depicts a block diagram of a hierarchy 500 of arrays for managing storage for a distributed network in accordance with one or more aspects of the present disclosure. The illustrated diagram depicts one example of a hierarchy of arrays through which a storage allocator, such as the storage allocator 112 of FIG. 1 described above, proceeds in order to populate a list or ring of suggested storage locations to satisfy a storage allocation request. The generated list may be sent by the storage allocator to a volume manager, such as the volume manager 104 of FIG. 1, to allocate storage.

Initially, various identifiers for available storage devices and nodes may be compiled into a rough database corresponding to a network. Each device identifier may be added to the database automatically upon detection or manually by a live administrator. The identifiers for the devices and nodes may be added to the database relatively unorganized or may have a particular structure or organization.

The storage allocator may then sort the database (described in greater detail below) to create a tree of nested arrays as shown in FIGS. 4 and 5. From the sorted data structure or tree, an algorithm (described in greater detail below) may be executed by the storage allocator to create an ordered list of device pointers or indicators ordered such that each contiguous element in the list is within a different failure zone.

At a high level, to generate the list from the sorted tree shown in FIG. 5, the storage allocator initializes a counter 502. The counter 502 may have an initial value of 0 or 1 and may be incremented by one each cycle (i.e. 0→1→2→3, etc.). The value of the counter 502 is correlated to an identifier entry in a failure array 504. The entry corresponding to the counter 502 will provide a first selected failure zone. For example, assuming the initial value of the counter is 0 (i=0), the failure zone selected from the failure array 504 will be Z0 or Zone Zero. The storage allocator moves from the selected failure zone Z0 to the node array 506 corresponding to the failure zone Z0. The corresponding value in the node array 506 is identified based on the counter 502. With i=0, the node selected is N0 or Node Zero. Within the storage device array 508 corresponding to N0, the counter 502, with i=0, identifies the first storage device, D0 or Device Zero. At this point, the first storage device in the list is fully identified. The storage device identified is in Zone Zero, Node Zero, and is Device Zero. As a result, the first list value may read "[Z0][N0][D0]." Other notations, designations, or terminology may be used. For example, the device may be identified by a tuple composed of other Zone, Node, and Device identifiers to uniquely identify the device across the network or cluster. For example, another annotation may be (3, 'my node', '/dev/sdc').

To select the second storage location for the list, the storage allocator increments the counter 502 to a next value. For example, the counter 502 may be incremented from i=0 to i=1. The process of identifying a failure zone, node, and storage device is repeated based on the counter 502. For example, the counter value of i=1 would identify a second failure zone Z1 within the failure array 504. Failure zone Z1 or Zone One has a corresponding node array (not shown). A node identifier is selected from the node array corresponding to Z1. Based on the counter value of i=1, the node selected may be N1 or Node One if the node array includes N1. Assuming it does, N1 has a corresponding storage device array (not shown). The storage allocator would then select a storage device from the storage device array corresponding to N1. The device is selected based on the counter value of i=1. At this counter value, the storage allocator may add storage device D1 or Device One to the list of suggested storage devices.

At this point, the storage allocator has built an ordered list of suggested storage devices. One example of the entries in the list may be: [Z0][N0][D0], [Z1][N1][D1]. The process may continue to run to produce more suggested devices. As seen in this example, each device is taken from a separate failure zone to provide resistance to failure events. The list built by the storage allocator may be referred to as a ring because, as the counter value exceeds the number of failure zones, nodes, or storage devices, the storage allocator may again revert to identify the first failure zone, node, or device in the array. For example, if the counter value has been incremented to i=9 and the failure array 504 only includes Z0 to Z7, the failure zone selected by the storage allocator at i=9 would be Z0 or Zone One once again. The same circular or ring functionality also applies to the node array 506 and the storage device array 508. For example, if the counter value is i=4, then Zone Three (Z3) is selected. However, the node array corresponding to Z3 may only include nodes N0, N1, and N2. The storage allocator may circle back to the first node, N0 based on the counter value i=4. The process would continue by selecting from the storage device array corresponding to N0, say Device Three (D3). Thus, the suggested device may be identified by [Z3][N0][D3].

As the storage allocator continues to build the list, identification of each component may loop around any number of times based on the counter value 502. This may be accomplished by implementing a "mod" function such as modular arithmetic or other operation as described herein to wrap a pointer around a last element back to a first element once the quantity of element identifiers in the array has been exceeded.

In some instances, a node may no longer be available for storage allocation. The node may be temporarily or permanently unavailable for any number of reasons. Additionally, a failure zone may no longer be available or be relevant or applicable. For example, a failure may have occurred which prevents access to all devices in that zone or the shared point of failure which necessitated the failure zone may have been remedied. In some examples, the storage allocator may remove the failure zone or node identifier from the database. After removal of a failure zone, node, or storage device identifier, the storage allocator may regenerate the list to avoid any erroneous suggestions of resources no longer available or failure zones that are no longer accurate. In one example, as devices are added or removed from the network, the storage allocator may add or remove the corresponding device identifiers from the list with corresponding mapping to a node and a failure zone. In another example, the list is removed and rebuilt entirely.

With the list updated, it may be returned to a requestor, such as the volume manager, with the initial device identifier selected from any point in the list. For example, the requestor may provide an identifier (such as a universal unique identifier 'UUID') with the storage allocation request. The identifier may be hashed to a device identifier in the list in order to balance the utilization of devices in the list. The hashed identifier may specify a position in the list. The requestor may provide other values or identifiers which may be hashed or otherwise implemented to determine the location in the list from which the suggested storage devices are pulled.

The list of device identifiers received by the requestor will provide a series of devices, selected beginning at any location in the list, which will have a subsequent device in the list that is within a separate failure zone (as long as there is more than one failure zone with available storage devices in the network or cluster). As described above, the list may be considered a ring as the list may revert back to the first device in the list after passing beyond the final device in the list. In one example, the storage allocator may execute a balancing operation to move to a different location in the list and ensure that the allocation of storage across the network is balanced and updated to include only active devices and devices that have available space.

The caller, which may include the volume manager 104 of FIG. 1, then receives the suggested devices from the list. For example, the caller may receive the following structure:

[
  {Zone3, Node 192.168.13.100, Device/dev/sda},
  {Zone2, Node 192.168.12.100, Device/dev/sda},
  {Zone4, Node 192.168.14.100, Device/dev/sda},
  {Zone1, Node 192.168.11.100, Device/dev/sda},
  {Zone3, Node 192.168.13.100, Device/dev/sdb},
  {Zone2, Node 192.168.12.100, Device/dev/sdb}
]

The caller may then allocate storage or go through the list and look for devices which match any requirements set forth in the request, such as request 206 of FIG. 2, to allocate the acceptable devices as storage for the requested volume. Once identified, the storage may be dedicated to a directory, a brick of characters, or other organization or structure of data.

Figure 6:
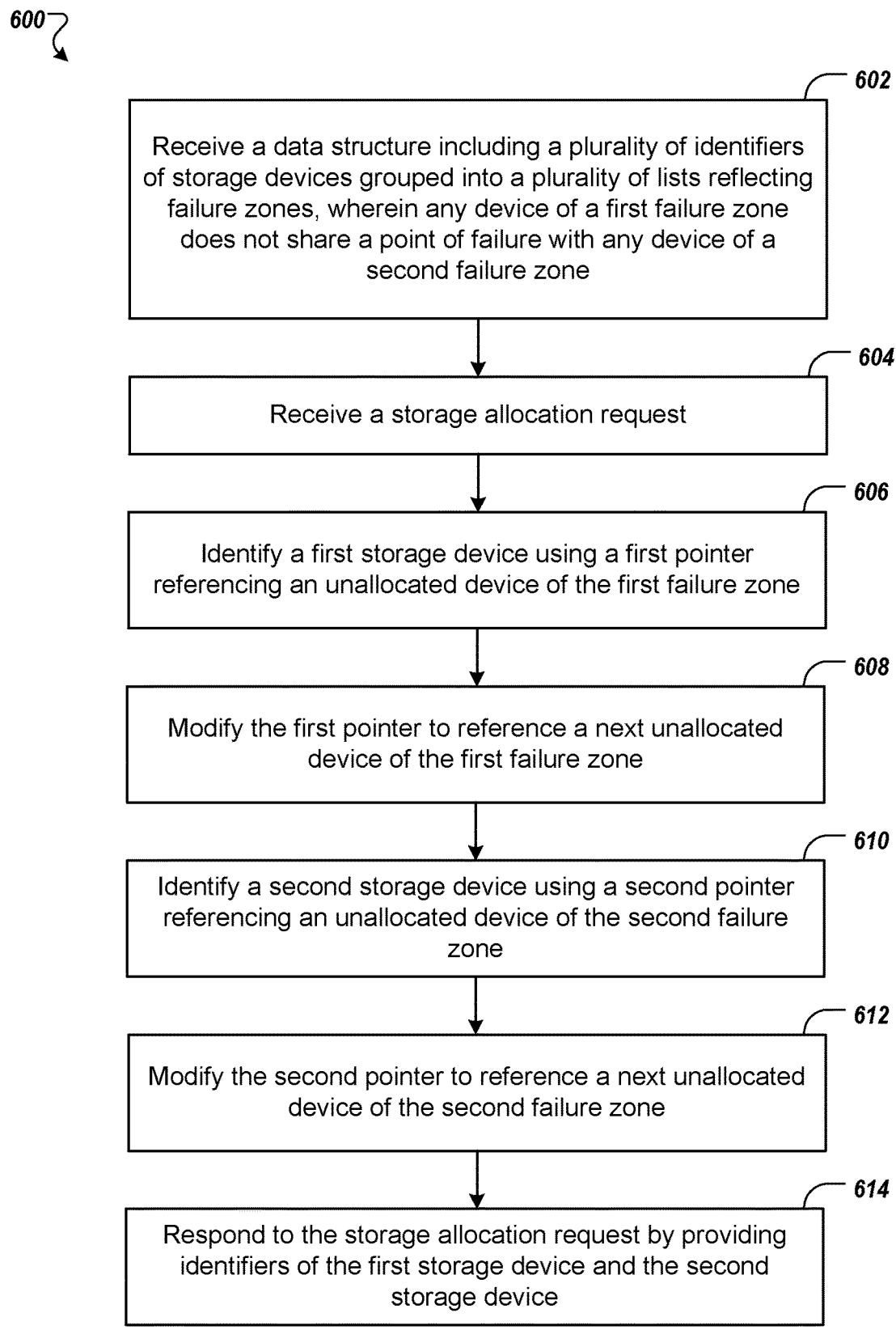
FIG. 6 depicts a flow diagram of a method for managing storage for a distributed network in accordance with one or more aspects of the present disclosure.

FIG. 6 depicts a flow chart diagram of a method 600 for managing storage for a distributed network in accordance with one or more aspects of the present disclosure. In some examples, the system 100 of FIG. 1 may perform the method 600 to manage storage for a distributed network. The method 600 may be performed by processing logic that may comprise hardware (circuitry, dedicated logic, etc.), software (such as is run on a general purpose computer system or a dedicated machine), or a combination of both. Alternatively, in some other examples, some or all of the method 600 might be performed by other components of system. As noted above, the portions of the method 600 depicted in FIG. 6 can be performed simultaneously or in a different order than that depicted.

Method 600 begins at block 602 at which a processing device may receive a data structure including a plurality of identifiers of storage devices grouped into a plurality of lists reflecting failure zones. Any device identified in a first failure zone does not share a point of failure with any device of a second failure zone. The first and second failure zones may be organized into an array of failure zones. Other examples may include more than two failure zones. Each failure zone in the array of failure zones may have a corresponding array of storage device identifiers. In some examples, the data structure may organize each failure zone into an array of node identifiers with each node identifier including a corresponding array of storage device identifiers. In other examples, other structures or forms may be used to organize the data within the data structure. In some examples, the storage allocator may receive the data structure. In another example, other components may receive the data structure.

At block 604, a volume manager may receive a storage allocation request. The request may be received by the volume manager, such as the volume manager 104 of FIG. 1. The request may come from an external requestor or the requestor may be a component that is internal to the system of the volume manager.

At block 606, the storage allocator, such as the storage allocator 112 of FIG. 1, may identify a first storage device using a first pointer referencing an unallocated device of the first failure zone. In some examples, the first device may be "unallocated" in that no portion of the storage device has been allocated to another request. In another example, the first device may be "unallocated" in that there is some portion of the first device that is unallocated or, in other words, the first device is not wholly allocated to one or more requests. The pointer may be a pointer supported by any number of programming languages.

At block 608, the storage allocator may modify the first pointer to reference a next unallocated device of the first failure zone. In some examples, the storage allocator may perform pointer arithmetic to manipulate a value or reference of the first pointer. Other examples may incorporate other approaches or manners of modifying the pointer.

At block 610, the storage allocator may identify a second storage device using a second pointer referencing an unallocated device of the second failure zone.

At block 612, the storage allocator may modify the second pointer to reference a next unallocated device of the second failure zone.

In some examples, the storage allocator may identify the first and second device simultaneously or in a sequence. In some examples, the storage allocator may generate a list from the first storage device and the second storage device.

At block 614, the volume manager may respond to the storage allocation request by providing identifiers of the first storage device and the second storage device. In some examples, the storage allocator provides a list of potential storage devices to the volume manager. The list may have identifiers of potential devices in a certain order by failure zone such that each consecutive identifier in the ring points to a storage device in a different failure zone than the immediately previous storage device in the list and the subsequent storage device in the ring. The volume manager may provide the storage allocator with a value to determine a location in the ring. The storage allocator may receive the value from the volume manager and return the ring to the volume manager with the identifier for the first storage device corresponding to the value provided by the volume manager. As storage is allocated to devices in the list, the storage allocator may advance around the list. As the storage allocator gets to the end of an array, such as the array of failure zones, nodes, or storage devices, the storage allocator may perform a modular arithmetic to return to the first value in the array based on the number of elements in that array. Other manners of recycling elements in the array may be implemented.

As described above, the list built by the storage allocator may be considered a ring as it uses operations such as modulo addition, modular arithmetic, or "mod" operations to cycle through each of the identified failure zones, nodes, and storage devices, on the network. The list of potential storage locations provides a list of resource identifiers in which none of the contiguous storage locations or storage devices are within the same failure zone (provided that there is more than one failure zone identified in the network).

One of the first and second storage devices may be selected to provide a redundant copy for data to fill the requested allocation. Additionally, in some examples, the selection of the first and second storage devices may be based on criteria from the request. For example, the first and second storage locations may be checked to verify that sufficient space is available based on a size of the storage in the allocation request. Other parameters such as access speed, connectivity, device type, and/or structure may be used to select the storage devices from the ring to satisfy the request.

Figure 7:
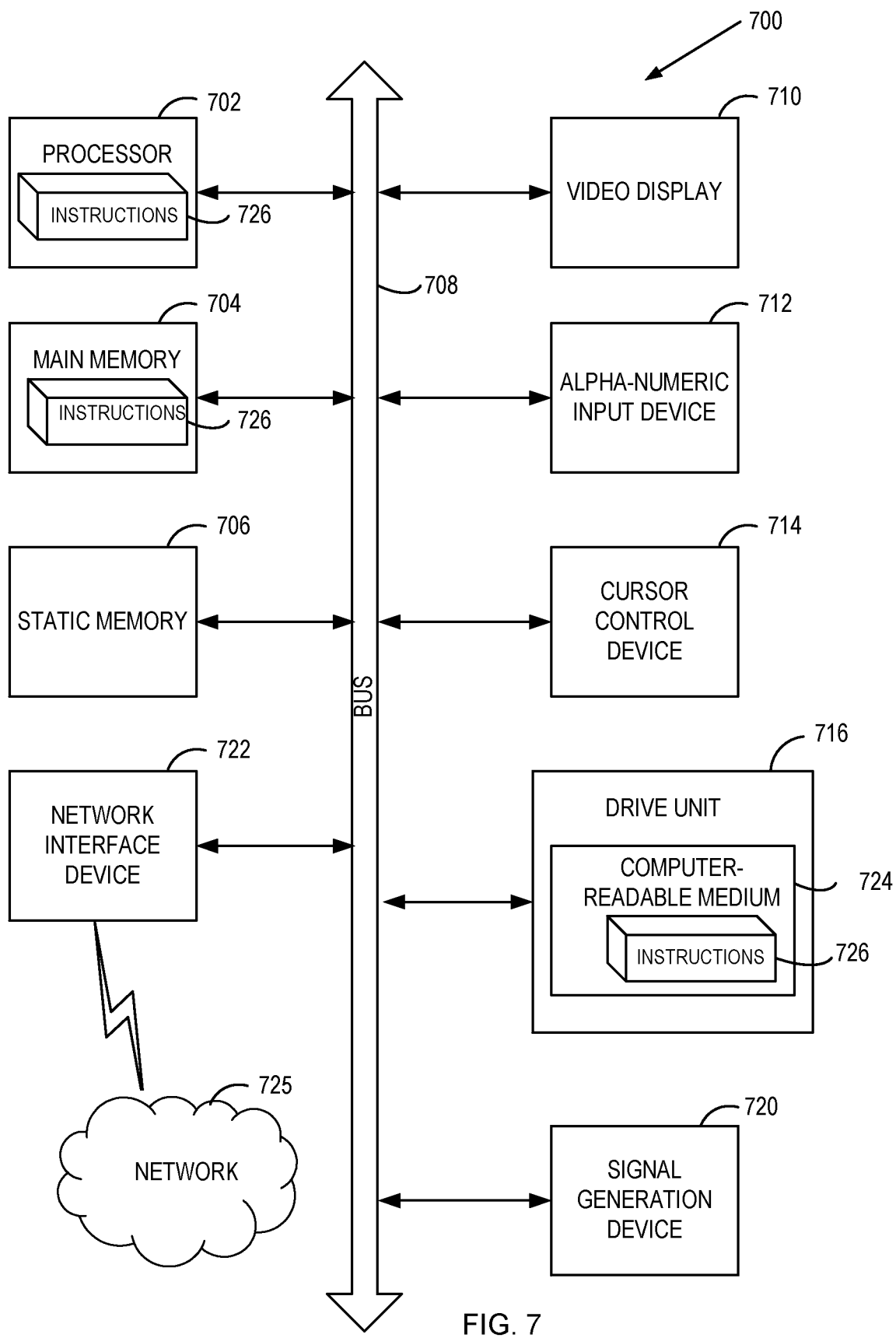
FIG. 7 depicts a block diagram of an example computer system operating in accordance with one or more aspects of the present disclosure.

FIG. 7 depicts a block diagram of an example computer system 700 operating in accordance with one or more aspects of the present disclosure. As used herein, "Processor" refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

"Memory" herein refers to a volatile or non-volatile memory device, such as RAM, ROM, EEPROM, or any other device capable of storing data.

In one example, computer system 700 may correspond to computer system 100 of FIG. 1. The computer system may be connected (e.g., networked) to other computer systems in a LAN, an intranet, an extranet, or the Internet. The computer system 700 may operate in the capacity of a server in a client-server network environment. The computer system 700 may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a drive unit 716, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions that may include instructions to execute instructions 726 for performing the operations and steps discussed herein. For example, in one example, the instructions 726 may perform any one of the methods of flow diagram 600 of FIG. 6.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The drive unit 716 or secondary memory may include a computer-readable medium 724 on which is stored one or more sets of instructions 726 (e.g., instructions for the instructions) embodying any one or more of the methodologies or functions described herein. Instructions for the instructions 726 may also reside, completely or at least partially, within the main memory 704 and/or within the processor 702 during execution thereof by the computer system 700, the main memory 704 and the processor 702 also constituting computer-readable media. Instructions 726 may further be transmitted or received over a network via the network interface device 722. The instructions 726 may further be transmitted or received over a network 725 via the network interface device 722.

The non-transitory computer-readable storage medium 724 may also be used to store the instructions 726 persistently. While the computer-readable storage medium 724 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, non-transitory computer-readable storage mediums, solid-state memories, optical media, and magnetic media.

The instructions 726, components and other features described herein can be implemented as discrete hardware components or integrated in the functionality of hardware components such as ASICS, FPGAs, DSPs or similar devices. In addition, the instructions 726 can be implemented as firmware or functional circuitry within hardware devices. Further, the instructions 726 can be implemented in a combination hardware devices and software components. For example, the functionality of this module can exist in a fewer or greater number of modules than what is shown, with such modules residing at one or more computing devices that may be geographically dispersed. The modules may be operable in conjunction with network 725 from which it may receive and provide relevant information regarding isolating network resources in a virtualized environment.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions above are presented in terms of code, algorithms, and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "populating", "receiving", "generating", "allocating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
  receiving, by a processing device, a data structure comprising a plurality of identifiers of storage devices grouped into a plurality of lists reflecting failure zones, wherein any storage device of a first failure zone of the failure zones does not share a common point of failure with any storage device of a second failure zone of the failure zones, wherein the common point of failure corresponds to a common resource shared by two or more of the storage devices;
  in response to receiving a storage allocation request, identifying, in view of the data structure, a first storage device of the first failure zone that fulfills the storage allocation request and a second storage device of the second failure zone that fulfills the storage allocation request, wherein identifying the first storage device and the second storage device comprises:
- identifying, using a first pointer referencing an unallocated device of the first failure zone, the first storage device of the first failure zone;
- modifying the first pointer to reference a next unallocated device of the first failure zone;
- identifying, using a second pointer referencing an unallocated device of the second failure zone, the second storage device of the second failure zone; and
- modifying the second pointer to reference a next unallocated device of the second failure zone; and responding to the storage allocation request by providing a list of suggested devices for fulfilling the storage allocation request, wherein a first element of the list of suggested devices comprises a first failure zone identifier identifying the first failure zone and a first device identifier identifying the first storage device, and wherein a second element of the list of suggested devices comprises a second failure zone identifier identifying the second failure zone and a second device identifier identifying the second storage device.

2. The method of claim 1, wherein modifying the first pointer comprises wrapping the first pointer around a last element of the first failure zone.

3. The method of claim 1, wherein the plurality of lists comprises a tree, the tree comprising a plurality of failure zone arrays, each failure zone comprising a plurality of node arrays, each node array comprising a plurality of storage device identifiers.

4. The method of claim 1, further comprising:
- assigning the first storage device to the first failure zone in response to determining that the first storage device relates to a first point of failure associated with the first failure zone; and
- assigning the second storage device to the second failure zone in response to determining, by the processing device, that the second storage device relates to a second point of failure associated with the second failure zone.

5. The method of claim 1, wherein the common resource comprises at least one of a power resource, a network resource, or a data center.

6. The method of claim 1, further comprising:
- storing data, associated with the storage allocation request, to the first storage device; and
- storing a replicate of the data to the second storage device.

7. The method of claim 1, wherein the first storage device comprises at least one of a physical device, a virtual device, or a container device.

8. A system comprising:
a memory to store a data structure; and
a processing device operatively coupled to the memory, the processing device to:
- receive the data structure comprising a plurality of identifiers of storage devices grouped into a plurality of lists reflecting failure zones, wherein any storage device of a first failure zone of the failure zones does not share a common point of failure with any storage device of a second failure zone of the failure zones, wherein the common point of failure corresponds to a common resource shared by two or more of the storage devices;
- in response to receiving a storage allocation request, identify, in view of the data structure, a first storage device of the first failure zone that fulfills the storage allocation request and a second storage device of the second failure zone that fulfills the storage allocation request, wherein to identify the first storage device and the second storage device, the processing device is further to:
  - identify, using a first pointer referencing an unallocated device of the first failure zone, the first storage device of the first failure zone;
  - modify the first pointer to reference a next unallocated device of the first failure zone;
  - identify, using a second pointer referencing an unallocated device of the second failure zone, the second storage device of the second failure zone; and
  - modify the second pointer to reference a next unallocated device of the second failure zone; and
- respond to the storage allocation request by providing a list of suggested devices for fulfilling the storage allocation request, wherein a first element of the list of suggested devices comprises a first failure zone identifier identifying the first failure zone and a first device identifier identifying the first storage device, and wherein a second element of the list of suggested devices comprises a second failure zone identifier identifying the second failure zone and a second device identifier identifying the second storage device.

9. The system of claim 8, wherein to modify the first pointer, the processing device is further to wrap the first pointer around a last element of the first failure zone.

10. The system of claim 8, wherein the plurality of lists comprises a tree, the tree comprising a plurality of failure zone arrays, each failure zone comprising a plurality of node arrays, each node array comprising a plurality of storage devices.

11. The system of claim 8, wherein the processing device is further to:
- assign the first storage device to the first failure zone in response to determining that the first storage device relates to a first point of failure associated with the first failure zone; and
- assign the second storage device to the second failure zone in response to determining, by the processing device, that the second storage device relates to a second point of failure associated with the second failure zone.

12. The system of claim 8, wherein the common resource comprises at least one of a power resource, a network resource, or a data center.

13. The system of claim 8, wherein the processing device is further to:
- store data to the first storage device; and
- store a replicate of the data to the second storage device.

14. The system of claim 8, wherein the first storage device comprises at least one of a physical device, a virtual device, or a container device.

15. A non-transitory computer readable medium comprising executable instructions that when executed by a processor device, cause the processing device to:
- receive a data structure comprising a plurality of identifiers of network resource devices grouped into a plurality of lists reflecting failure zones, wherein any network resource device of a first failure zone of the failure zones does not share a common point of failure with any network resource device of a second failure zone of the failure zones, wherein the common point of failure corresponds to a common resource shared by two or more of the network resource devices;

in response to receiving a storage allocation request, identify, in view of the data structure, a first network resource device of the first failure zone that fulfills the storage allocation request and a second network resource device of the second failure zone that fulfills the storage allocation request, wherein to identify the first network resource device and the second network resource device, the processing device is further to:
   identify, using a first pointer referencing an unallocated device of the first failure zone, the first network resource device of the second failure zone;
   modify the first pointer to reference a next unallocated device of the first failure zone;
   identify, using a second pointer referencing an unallocated device of the second failure zone, the second network resource device of the second failure zone; and
   modify the second pointer to reference a next unallocated device of the second failure zone; and
respond to the storage allocation request by providing a list of suggested devices for fulfilling the storage allocation request, wherein a first element of the list of suggested devices comprises a first failure zone identifier identifying the first failure zone and a first device identifier identifying the first network resource device, and wherein a second element of the list of suggested devices comprises a second failure zone identifier identifying the second failure zone and a second device identifier identifying the second network resource device.

16. The non-transitory computer readable medium of claim 15, wherein to modify the first pointer, the executable instructions cause the processing device further to wrap the first pointer around a last element of the first failure zone.

17. The non-transitory computer readable medium of claim 15, wherein the plurality of lists comprises a tree, the tree comprising a plurality of failure zone arrays, each failure zone comprising a plurality of node arrays, each node array comprising a plurality of network resource devices.

18. The non-transitory computer readable medium of claim 15, wherein the executable instructions cause the processing device further to:
   identify the first network resource device on a network;
   associate the first network resource device with a corresponding node; and
   assign the first network resource device and the corresponding node to the first failure zone.

19. The non-transitory computer readable medium of claim 17, wherein the executable instructions cause the processing device further to:
   access the first network resource device; and
   access the second network resource device as a redundant resource.

20. The non-transitory computer readable medium of claim 15, wherein the first network resource device comprises a storage device, a networking device, or a processor.

* * * * *